United States Patent [19]

Cox et al.

[11] 4,234,986
[45] Nov. 25, 1980

[54] BEE BOARD CLEANING DEVICE

[76] Inventors: Donald R. Cox, Box 44; Theodore C. Barber, P.O. Box 5, both of Orovada, Nev. 89425

[21] Appl. No.: 4,676

[22] Filed: Jan. 19, 1979

[51] Int. Cl.³ .............................................. A01K 51/00
[52] U.S. Cl. ..................................... 6/12 R; 6/12 A
[58] Field of Search .................. 6/12 R, 12 A, 12 M; 15/21 D, 104.2

[56] References Cited

U.S. PATENT DOCUMENTS

| 2,531,709 | 11/1950 | Taylor | 6/12 A |
| 3,936,894 | 2/1976 | Barber | 6/11 |
| 3,965,509 | 6/1976 | Barber | 6/12 A |

FOREIGN PATENT DOCUMENTS 2253452  7/1975  France ................................. 6/12 A Primary Examiner—Gene Mancene
Assistant Examiner—Robert P. Swiatek
Attorney, Agent, or Firm—Wells, St. John & Roberts

[57] ABSTRACT

A device for cleaning individual grooved "bee boards" that provide nesting for leaf-cutter bees. The device includes guides for directing successive boards along a path parallel to the grooves past cell removing tines and a rotatable drum. The tines remove cells from the grooves. Pivotable sets of bristles are mounted to the drum to protrude outwardly therefrom due to centrifugal force when the drum is rotated. The drum axis is perpendicular to the grooves and the path of the boards. It is situated adjacent to the surface of the boards so the groove walls will be engaged by the sets of bristles as the drum is rotated. The bristles are provided in sets that are spaced apart by distances equal to the spacing between adjacent grooves. The bristles will therefore engage the bee boards only within the grooves. Debris is cleaned from the groove walls as the bee boards are moved past the rotating drum.

18 Claims, 8 Drawing Figures

U.S. Patent   Nov. 25, 1980   Sheet 1 of 2   4,234,986
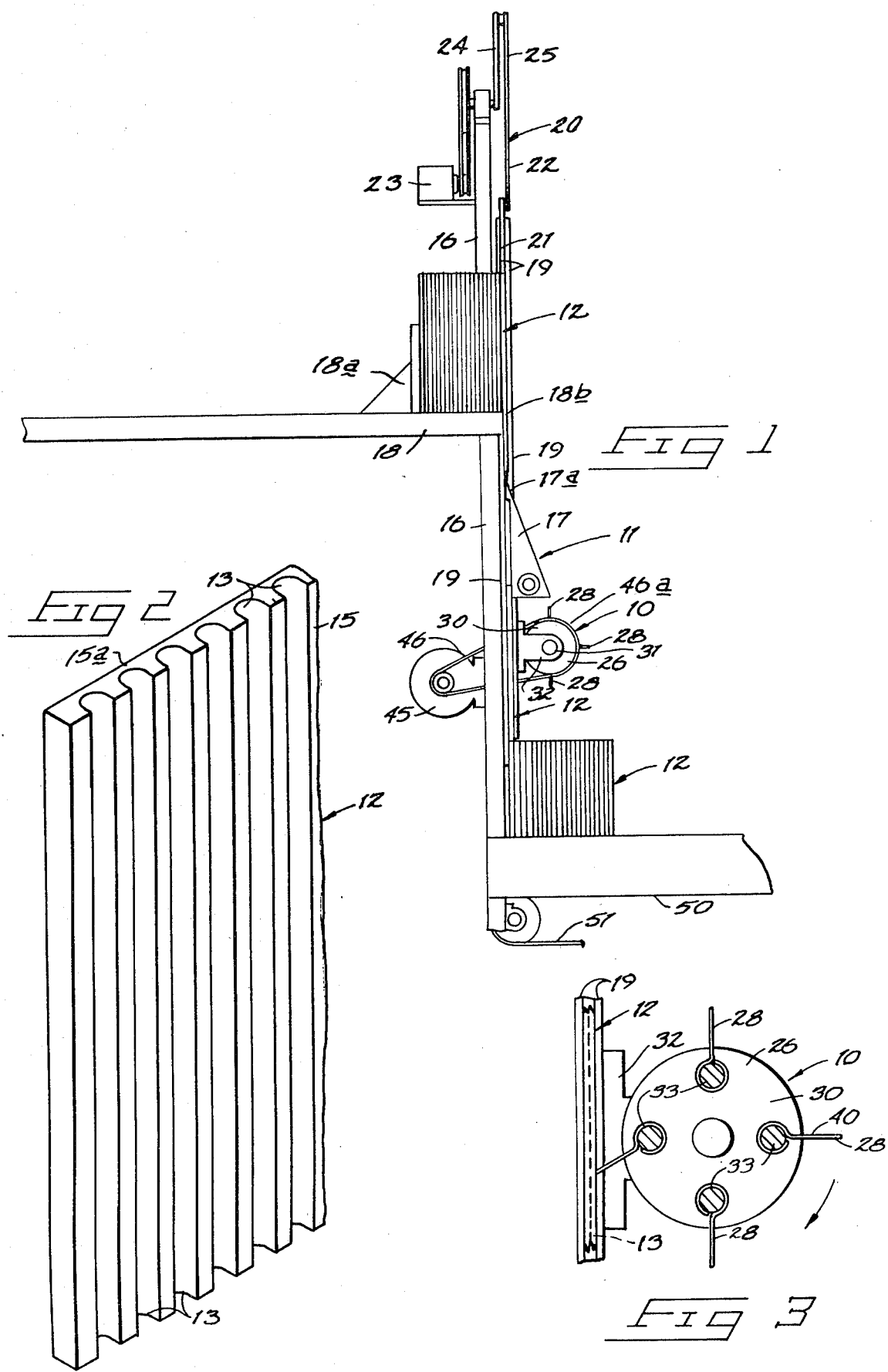

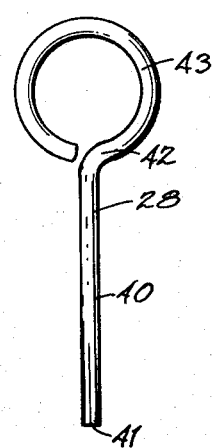
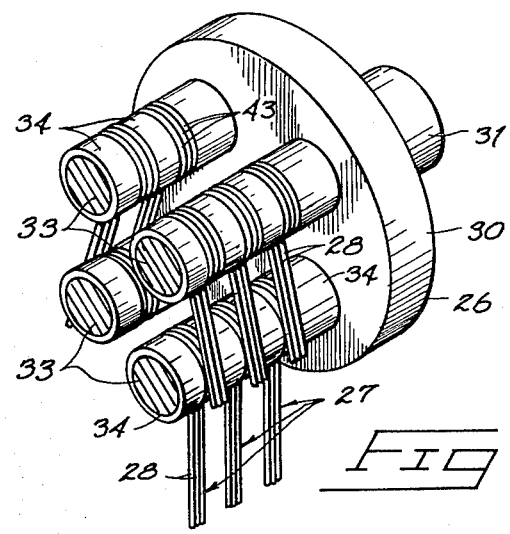
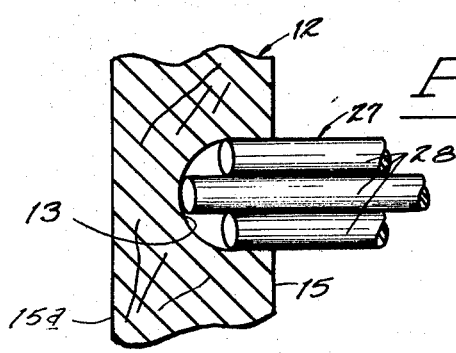
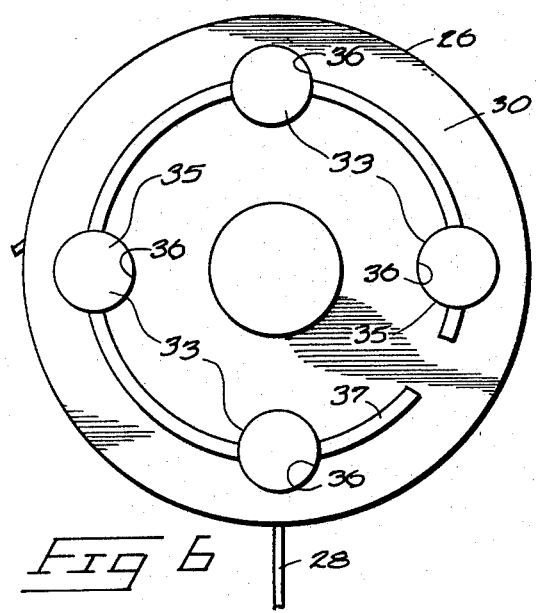
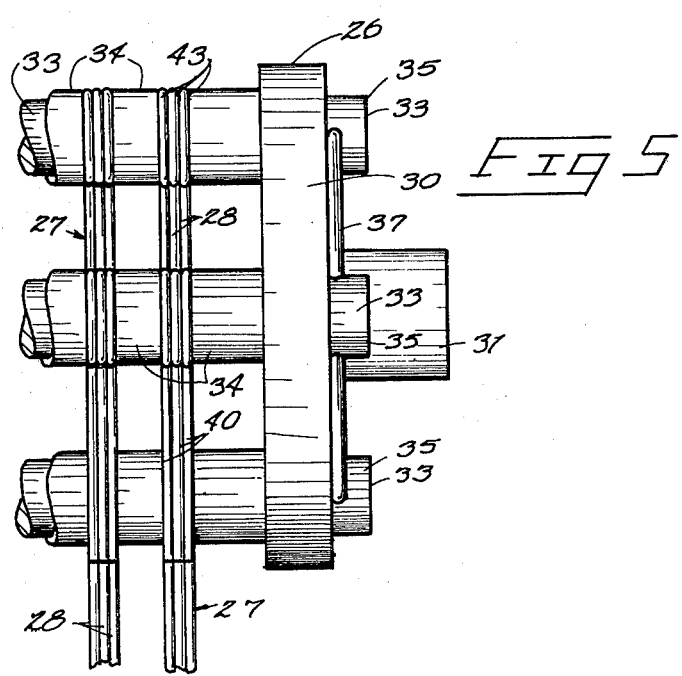

BEE BOARD CLEANING DEVICE

BACKGROUND OF THE INVENTION

The present invention is related to apparatus for cleaning elongated parallel grooves of "bee boards" that are utilized as nesting for leaf-cutter bees.

Certain bees, for example, *Megochile rotundata* have been used to facilitate pollenation of alfalfa blossoms for the production of alfalfa seed. These bees are known to confine their pollen seeking activities to a small area surrounding their nests, where the eggs are laid and hatched. The Megochile Rotundata or leaf-cutter bee has a natural affinity for alfalfa blossoms and for nesting within closed end tunnels formed within wood. In order to provide nests wherein the bees may deposit their eggs in sufficient quantities to be effective, it is desirable to have a nesting unit of a portable nature with capacity for holding several thousand eggs.

U.S. Pat. No. 3,936,894 granted to Theodore C. Barber on Feb. 10, 1976 discloses a successful form of artificial nest for hatching bees, particularly the leaf-cutter bee. The nest is comprised of a plurality of thin wooden boards that each have parallel grooves formed along one surface thereof. The grooves extend from one edge of the board to another. The "bee boards" are held together in a stack with a flat surface of one board engaging a grooved surface of an adjacent board to form tunnels through the assembled nest. A seal member is removably attached to one side of the nest to close off the groove openings on that side. Female leaf-cutter bees select the bores for laying eggs in leaf cuttings that are carried into the tunnels. Each egg is surrounded by leaf cuttings and is separated from adjacent eggs in the same tunnel by small plugs of leaf material. The leaves and end plugs form individual cells that are aligned axially within the tunnel, several being situated end to end to fill the tunnel. The filled tunnels are then closed at their open ends by relatively thick plugs, also formed of leaf cuttings.

For proper propogation of the leaf-cutting bees, it is often necessary to remove the individual cells from the bee boards. This has been done by disassembling the nests into the individual board components and by scraping the cells out of the grooves.

A 1973 publication titled "Alfalfa Leaf-Cutter Bees for Pollenating Alfalfa in Western Canada," Publication No. 1495 of "Agriculture Canada" discusses various methods and equipment for handling leaf-cutter bees. In particular, a cell remover apparatus is disclosed for manually removing bee cells from the grooved bee boards. The individual boards are pushed in a path parallel to the grooves formed therein past dowels that are of complementary cross-sectional configuration to the grooves. The dowels are pointed at one end to pry the cells away from the boards as they are pushed by. The cells fall down a trough and into a receiving tray. It states that 15,000 to 20,000 cells can be stripped from successive bee boards in less than half an hour. Large producers, however, require apparatus capable of handling millions of cells. Motorized cell removing apparatus therefore become desirable.

Such a motorized apparatus is illustrated in U.S. Pat. No. 3,965,509 granted to Theodore C. Barber on June 29, 1976. The apparatus automatically breaks up the individual boards from a nest, passes the boards past rows of teeth to remove the larvae and collects the larvae and cleaned boards.

The bee boards, once the cells have been removed, should be cleaned thoroughly before they are reused. This is done to prevent contamination of the next generation of bees and to thoroughly clean the bee boards for proper assembly. This has been accomplished in the past both chemically and mechanically. Chemical applications of common household bleach and water have been utilized to somewhat sterilize the boards. Conventional steam cleaners have been utilized to both decontaminate and clean the boards. Also, wire brushes are frequently used to scrape the leaf cutting residue that is typically left in some of the grooves after cell removal. This process can take substantially longer than the cell removing process, and care must be taken not to damage the boards.

The present invention was conceived to facilitate cleaning of the bee board grooves of residual leaf cuttings and debris left in the grooves after the removal of cells therefrom that will operate at a rate commensurate with that of a motorized cell removal machine.

BRIEF DESCRIPTION OF THE DRAWINGS

FIG. 1 is a fragmentary view of a machine incorporating elements of the present device;

FIG. 2 is a fragmentary isometric view of a bee board;

FIG. 3 is a sectional view taken through the drum of the present device;

FIG. 4 is a fragmentary pictorial view of a portion of the present drum and attached bristles and spacers;

FIG. 5 is an enlarged side elevation detail of a portion of the present drum assembly and attached bristles;

FIG. 6 is a view as seen from the right in FIG. 5;

FIG. 7 is an enlarged fragmentary view illustrating operation of the bristles; and FIG. 8 is an enlarged detail view of a bristle used with the present invention.

DETAILED DESCRIPTION OF A PREFERRED EMBODIMENT

A device exemplifying a preferred form of the present invention is illustrated in the accompanying drawings and is generally designated therein by the reference character 10. The device 10 may be utilized as an integral part of or as an attachment to a leaf-cutter bee cell removing machine 11 as generally shown in FIG. 1.

The device 10 is utilized to clean bee boards of the type shown at 12. Such bee boards 12 typically include a plurality of parallel grooves 13 extending between open ends on opposite parallel sides of the boards. An example of such a board is illustrated in FIG. 2. It is noted that the grooves 13 are shown only on one side of the board. However, it is entirely conceivable that the present device may be modified to accomplish a cleaning function on bee boards having grooves on opposite surfaces thereof.

The elongated parallel grooves 13 are spaced equally across a planar surface 15. With the form of board illustrated in FIG. 2, the surfaces 15 of one board are set against the flat planar surface 15a of an adjacent board to form open ended tunnels. A succession of the boards are placed together to form a nest. The "nest" or stack of boards is disassembled prior to cell removal by first disengaging a clamp member and by removing the backing material used to seal off the tunnels on one side of the nest. The cells may then be removed from the grooves within the individual bee boards.

The present machine includes a frame 16 mounting a hopper 18 for receiving the boards in a horizontal stack. A means 18a is provided to urge the boards toward an end 18b of the hopper where successive end boards of the stack come into alignment with a guide means 19 and the push bar 21 of a drive means 20.

The guide means 19 receives individual bee boards at the hopper end 18b and directs them downwardly in end to end engagement along a vertical path that is coplanar with the surfaces 15 and parallel with the grooves.

The drive means 20 is provided for moving the successive boards along the guide means 19. It includes a push bar 21 that fits within the guide means 19 and reciprocates vertically thereon through a stroke substantially equal to the height of boards in the hopper. It starts from a position above the board presently located at the hopper end 18b. It is lowered to engage the top edge of the end board to force it downwardly along guide means. The stroke carries the push bar beyond the bottom surfaces of the boards in the hopper so the top edge of the engaged board will clear the bottom edge of the next successive board. As the push bar 21 is moving downwardly, the next successive board slidably rests against the push bar in anticipation of being moved by means 18a into alignment with the guide means 19. This happens as the push bar is returned to its starting position above the hopper end 18b.

The drive means 20 includes a reciprocating linkage 22 and a drive motor 23. Motor 23 causes the linkage 22 to reciprocate the push bar in the vertical path along the guide means 19. It is shown in a side view by FIG. 1. A crank 24 of linkage 22 is rotated on the frame 16 by the motor 23. A connecting link 25 is pivotably mounted to an end of crank 24 and to push bar 21. Rotation of the crank is translated to reciprocation of push bar 21 through the mechanical relationship of the crank 24 and link 25.

Cell removal is accomplished mechanically by cell removing tines 17. Tines 17 are mounted to the frame 16 in the path of the boards as they are guided downwardly by guide means 19. Individual tines 17 are spaced across the path of the boards, one for each groove 13. Each tine 17 includes a pointed end 17a that is complementary in cross section to the grooves 13. The pointed ends engage and wedge or pry the cells outwardly where they can drop freely into a waiting container (not shown).

The groove cleaning mechanisms of the present device 10 include a drum 26. The drum 26 is rotatably mounted to the frame 16 for rotation about an axis that is transverse to the orientation of the parallel grooves 13 in successive boards moved along the guide means 19. Individual sets of bristles 28 are pivotably mounted to the drum 26 at spaced intervals thereon. They are pivoted about axes that are spaced from and parallel to the rotational axis of the drum. The bristles will extend, when the drum is rotated due to centrifugal force, radially to become engaged within the grooves of successive boards as they pass by. The bristle sets are spaced such that the bristles will engage only the grooves and will not touch the surfaces 15.

The drum 26 includes opposed end plates 30. The plates 30 include axial stub shafts 31 that are journalled by bearings 32 as means for rotatably mounting the drum 26 to the guide means 19 or frame 16. Four bristle mounting shafts 33 are mounted between the drum plates 30. They are equiangularly spaced about the axis of the drum and are spaced equally on a set radius from the drum axis. They define the pivot axes for the bristles 28.

The bristle sets 27 are spaced apart on the mounting shafts 33 by a number of tubular spacers 34. There is at least one spacer between successive sets of bristles 28. The spacers are removably mounted to the shafts to allow free access to the bristles.

The bristle mounting shafts 33 include free ends 35 that are received through complementary apertures 36 in at least one of the plates 30. The shaft ends are held in place on an outside surface of the engaged plate 30 by a circular retaining pin 37 that extends through apertures formed through the shaft ends. The pin is illustrated in FIGS. 5 and 6. It may be removed from the individual shafts to allow removal of the shafts from the plate and thus allow access to the spacers 34 and bristles 28.

An individual bristle 28 is illustrated in FIG. 8 and the sets are shown in FIGS. 4, 5 and 7. Each bristle 28 includes an elongated shank 40 that is formed of spring steel wire. The shank 40 includes an abrupt end 41. An opposite end 42 of the bristle is formed as an eyelet 43 of a diameter that is complementary to that of the bristle receiving shafts. The eyelets 43 are loosely received on the shafts 33 so the bristles will pivot relatively freely about the axis of the engaged shafts 33.

It is preferred that the bristles be provided in sets of three with the diameters of three shanks 40 being equal to or slightly less than complementary dimension across the grooves 13. FIG. 7 illustrates this relationship. The bristle sets will therefore not cause enlargement of the grooves but will function merely to clean residue from the cell removing operation.

The drum 26 is rotated by means of a motor 45 and linkage 46 (FIG. 1). The linkage may comprise a pulley and belt arrangement with the driven pulley 46a connected to one of the drum plates 30. The rotational speed is such that the rotating bristles on the drum will extend radially outward due to centrifugal force. A rotational drum speed of approximately 1750 rpm has been found to be effective.

The bearing means 32 mounts the drum 30 at a distance from the guide means such that the bristles will intersect the downward path of the bee boards. This relationship is illustrated in FIG. 3. The bristle sets engage the bee board within the grooves and are deflected downwardly as the drum is rotated in the direction indicated by the arrow in FIG. 3. The bristles will remain in contact within the groove until the drum is rotated further to bring the engaged bristles away from contact with the board. The next successive shaft 33 in the path of rotation of the drum brings its set of bristles into contact with the grooves, and so on. Each set of bristles is situated by the spacers 34 with respect to the groove spacings so the bristles will engage the boards only within the grooves.

The outward bristles of each set are the first to engage surfaces of the grooves as indicated in FIG. 7. They are therefore deflected slightly rearward (in the direction of rotation) of the central bristles. The central bristles are allowed to remain slightly more radial in relationship to the drum axis so they will extend further into the grooves and preferably engage the bottoms of the successive grooves as shown in FIG. 7. Slight defects along the lengths of the grooves may be compensated for within the individual sets of bristles by deflection of the spring shafts or by independent pivotal movement of the individual bristles on their mounting shafts 33. The bee board material will not be damaged by the bristles but will be effectively and efficiently cleaned at a rate commensurate within the cell removing operation taking place above.

The rotation of the drum is preferably in a direction to deflect the removed material upwardly and away from the boards collecting within a cleaned bee board collecting hopper 50 situated immediately below the drum 26. It receives and collects the cleaned boards in a stack to be later removed for further processing. It may include an indexing conveyor 51 operable in conjunction with the drive means 20 to index the cleaned boards incrementally as they are received from the guide means 19.

It is pointed out that the above description and attached drawings are of an exemplary nature and that various modifications may be made therein that fall within the scope of the amended claims.

What I claim is:

1. A bee board cleaning device for cleaning parallel elongated grooves that are spaced across planar surfaces of bee boards, comprising:
   a frame;
   guide means on the frame for receiving and guiding bee boards in a selected path parallel to the elongated grooves therein;
   a drum including axially oriented bristle mounting shafts;
   means mounting the drum adjacent to the guide means for rotation about a drum axis that is transverse to the path and to the bee board grooves;
   bristle means including a plurality of bristles mounted to the bristle mounting shafts on the drum for rotation with the drum and for pivotal movement thereon about axes parallel to the drum axis;
   means for rotating the drum and bristle means about the drum axis to cause the bristles to project outwardly by centrifugal force and engage along the grooves of bee boards held within the guide means; and
   spacers on the bristle shafts, dividing the bristles into sets spaced apart by distances equal to corresponding distances between grooves on the bee boards.

2. The device as defined by claim 1 wherein the bristle means is comprised of a number of sets of independently pivotable bristle members having elongated shanks extending outwardly from integral bristle mounting eyelets received on the bristle mounting shafts;
   and wherein the drum includes opposed end plates spaced apart axially by the bristle mounting shafts and wherein the shafts are parallel to the drum axis.

3. The device as defined by claim 1 wherein there are four bristle mounting shafts on the drum at a fixed radius from the drum axis and equi-angularly spaced about the drum axis; and
   the bristle means is comprised of a number of bristle sets,
   each bristle set having three independently pivotable bristles on a mounting shaft.

4. The device as defined by claim 1 wherein the drum includes opposed drum plates spaced apart by bristle mounting shafts and wherein the bristles are pivotably mounted in sets to the bristle mounting shafts; one of the drum plates being removably mounted to ends of the bristle mounting shafts to allow access to the bristles thereon.

5. The device as defined by claim 1 wherein the bristle sets each span an axial distance with respect to the drum axis substantially equal to the distance across a groove in the bee board.

6. The device as defined by claim 1 wherein the drum includes:
   opposed drum plates that include axial outwardly protruding stub shafts;
   wherein the means for mounting the drum adjacent the guide means includes bearings journalling the stub shafts on the frame; and
   wherein the means for rotating the drum is operatively connected to one of the stub shafts.

7. The device as set out by claim 1 wherein the individual bristles are formed of spring steel wire each having an elongated shank with an integral eyelet at one end thereof;
   and wherein the bristle mounting shafts pivotably receive the bristles by the eyelets thereon.

8. The device as set out by claim 7 wherein the sets of bristles are each comprised of three individual bristles, each being freely pivoted on a bristle mounting shaft and each having a cross-sectional diameter substantially equal to one third of the dimension across a bee board groove.

9. The device as defined by claim 7 wherein the drum includes end plates at ends of the bristle mounting shafts with one of the end plates being apertured to receive ends of the bristle mounting shafts and further comprising means for releasably securing the ends of the bristle mounting shafts to the one end plate.

10. The device as defined by claim 1 further comprising drive means for moving the bee boards within the guide means along the path past the drum.

11. In a cell removing machine for removing cells containing larvae of leaf-cutter bees from grooved bee boards, wherein each board includes a plurality of parallel grooves formed along one surface thereof and extending between opposed side edges;
   a frame;
   a hopper on the frame for receiving a stack of bee boards;
   means for moving the bee boards within the hopper toward one end thereof;
   drive means at the one end of the hopper for engaging successive bee boards and moving them vertically from the hopper;
   guide means for receiving successive bee boards moved vertically by the drive means and associated therewith to guide the successive bee boards along a vertical path parallel to the grooves formed therein;
   cell removing tines on the frame intersecting the path of the bee boards, engageable therewith to pry cells from the grooves as the boards are moved along the vertical path;
   a drum;
   means mounting the drum adjacent to the guide means for rotation about a drum axis that is transverse to the path and to the bee board grooves;
   bristle means including a plurality of bristles mounted to the drum for rotation with the drum and for pivotal movement thereon about axes parallel to the drum axis;
   means for rotating the drum and bristle means about the drum axis to cause the bristles to project outwardly by centrifugal force and engage along the grooves of bee boards held within the guide means; and wherein the bristles are spaced apart along the drum axis so they will engage the bee boards only within the elongated grooves formed therein.

12. The machine as defined by claim 11 wherein the bristle means is comprised of a number of sets of independently pivotable bristle members having elongated shanks extending outwardly from integral bristle mounting eyelets;

and wherein the drum includes opposed end plates spaced apart by parallel bristle mounting shafts, the mounting eyelets being received on the mounting shafts.

13. The machine as defined by claim 11 wherein there are four bristle mounting shafts on the drum at a fixed radius from the drum axis and equi-angularly spaced about the drum axis; and the bristle means is comprised of a number of bristle sets, each having three independently pivotable bristles on a mounting shaft.

14. The machine as defined by claim 11 wherein the drum includes opposed drum plates spaced apart by bristle mounting shafts and wherein the bristles are pivotably mounted in sets to the bristle mounting shafts; one of the drum plates being removably mounted to ends of the bristle mounting shafts to allow access to the bristles thereon.

15. The machine as defined by claim 14 further comprising spacers on the bristle mounting shafts between the sets of bristles to space the sets of bristles apart by distances equal to corresponding distances between grooves on the bee boards.

16. The machine as defined by claim 11 wherein the bristles are provided in sets, each set spanning an axial distance with respect to the drum axis substantially equal to the distance across a groove in the bee board.

17. The machine as set out by claim 16 wherein the sets of bristles are each comprised of three individual bristles, each being freely pivoted on a bristle mounting shaft and each having a cross-sectional diameter substantially equal to one third of the dimension across a bee board groove.

18. The machine as set out by claim 11 wherein the individual bristles are formed of spring steel wire each having an elongated shank with an integral eyelet at one end thereof;

and wherein the drum includes bristle mounting shafts for pivotably receiving bristles by the eyelets thereon.

* * * * *